June 27, 1967 G. VALENSI 3,328,518

COLOR TELEVISION RECEIVING STATIONS WITH PROJECTION SCREEN

Filed April 27, 1965 2 Sheets-Sheet 1

INVENTOR.
GEORGES VALENSI
BY Kurt Kelman
AGENT

INVENTOR.

GEORGES VALENSI

BY Kurt Kelman

AGENT

United States Patent Office 3,328,518

Patented June 27, 1967

3,328,518

COLOR TELEVISION RECEIVING STATIONS WITH PROJECTION SCREEN

Georges Valensi, 3 Rue des Chaudronniers, Geneva, Switzerland

Filed Apr. 27, 1965, Ser. No. 451,161
Claims priority, application France, May 12, 1964, 974,078
2 Claims. (Cl. 178—5.4)

ABSTRACT OF THE DISCLOSURE

An electro-optico-mechanical device for producing a projected television picture, in saturated colors corresponding to the received hue signal, comprising a source of collimated rays of polarized light going through three modulators controlled respectively by the blue, green and red components of said hue signal; further, an analyzer and a focussing lens to produce a bright colored spot. A disc bearing a circular assembly of small lenses rotates at a stabilized speed between said spot and the hole of a large concave mirror followed by a smaller convex mirror. The motion of the upper small lens produces, between these mirrors, one line of bright colored spots the enlarged image of which is one line of said projected television picture.

Figure 1A:
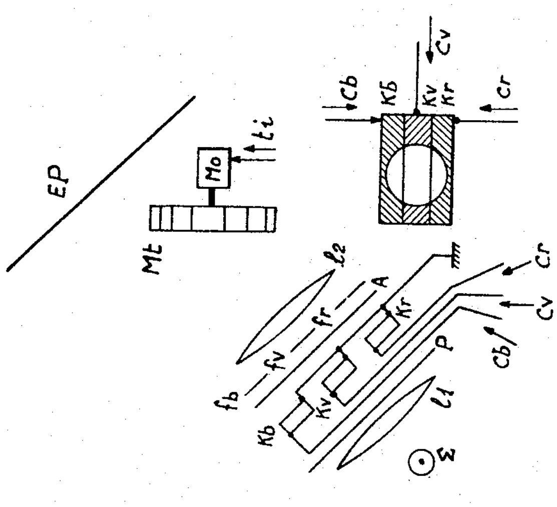
Figure 1:
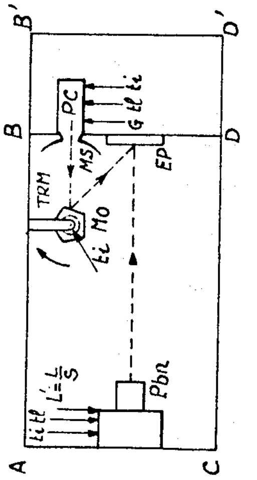

The present invention concerns an improvement in or modification of the color television receiving station described in U.S. Patent No. 2,990,449 and represented on Figure 1 attached to the specification of said patent; the principle of said receiving station is illustrated by the appended FIGURES 1 and 1*a*.

The following signals are extracted from the received video-signals: L, luminance signal, corresponding to the brightness; C, hue signal, characterizing the hue (or dominant radiation) of the color; S, stauration signal proportional to the degree of saturation of said color; $t_1$, field synchronizing signal; $t_1$, line synchronizing signal. On the projection screen EP are superimposed, on each other (like on the appended FIGURE 1), a detached black and white picture of the televised scene produced by a projector $P_{bn}$ controlled by the "luminance weighted signal" $L'=L/S$, and a coarse picture of said scene, in saturated colors, produced by another projector PC controlled by the hue signal C. These two projectors are synchronized with the scanning of said scene by signal $t_i$ and $t_l$.

The projector PC is schematically shown on the appended FIGURE 1*a*; $\Sigma$ is a powerful source of white light at the focus of collimating lens $l_1$; P is a polarizer and A is an analyzer crossed with P; $f_b$, $f_v$, $f_r$ are interferential color filters passing respectively either light of saturated blue color $f_b$, or light of saturated green color $f_v$, or light of saturated red color $f_r$; $K_b$, $K_v$, $K_r$ are transparent crystals becoming birefringent when a voltage: corresponding to the blue component $C_b$ of the hue signal C is applied to $K_b$, or corresponding to the green component $C_v$ of the hue signal C is applied to $K_v$, or corresponding to the red component $C_r$ of the hue signal C is applied to $K_r$; the electrodes of these juxtaposed crystals are the (hatched) metallized parts of their faces, parallel to polarizer P, as shown at the right of FIGURE 1*a*; the non-hatched circle corresponds to collimating lens $l_1$, producing the parallel rays of white light going through polarizer P, then, through the transparent parts of $K_b$, $K_v$, $K_r$, then, through analyzer A, followed by color filters $f_b$, $f_v$, $f_r$.

$l_2$ is a focussing lens, concentrating the blue, or green, or red light, at its focus on projection screen EP, after reflection upon one of the mirrors of rotating drum $M_t$ having, along its periphery, a plurality of mirrors making different angles with the axis of electric motor $M_o$, the motion of which is synchronized by the field synchronizing signals $t_i$, so that these mirrors move the colored spot produced at the focus of lens $l_2$ along the successive lines of one field of the coarse colored picture of the televised scene.

The electro-optico-mechanical device shown on FIGURE 1*a* can enlight sufficiently *only* a projection screen EP of small dimensions, the enlightment (expressed in lux, or 1/10 of a foot lambert) being given by the formula:

$$E=\frac{1}{6}\,\frac{B.S.}{N.D.^2}$$

N being the number of distinct elements of the coarse picture of the televised scene, B being the luminance of the light source $\Sigma$, FIGURE 1*a*, expressed in stilbs (candelas per square centimeter), S being the surface of lens $l_2$ expressed in square centimeters, D being the length of the light-path from lens $l_2$ to mirror drum M*t* and further to the screen EP, expressed in meters; the coefficient $1/6=1/2\times 1/3$ is due to the fact that polarizer P absorbs one-half of the luminous flux emerging from lens $l_1$, and to the fact that only one of the three crystals $K_b$, $K_v$, $K_r$ may be active for certain colors.

The object of the present invention is an improved electro-optico-mechanical device, affording the possibility of using a *much larger* projection-screen, for example in a theater (or in a university amphitheater), as shown on FIGURE 1, enlighted by a powerful source of light, the color of which is modulated by three transparent crystals $K_b$, $K_v$, $K_r$ becoming birefringent under control of applied voltages corresponding to the components $C_b$, $C_v$, $C_r$ of the hue signal C.

Figure 3:
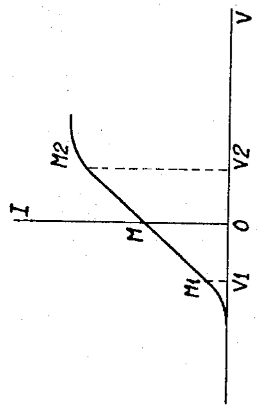
Figures 2, 4:
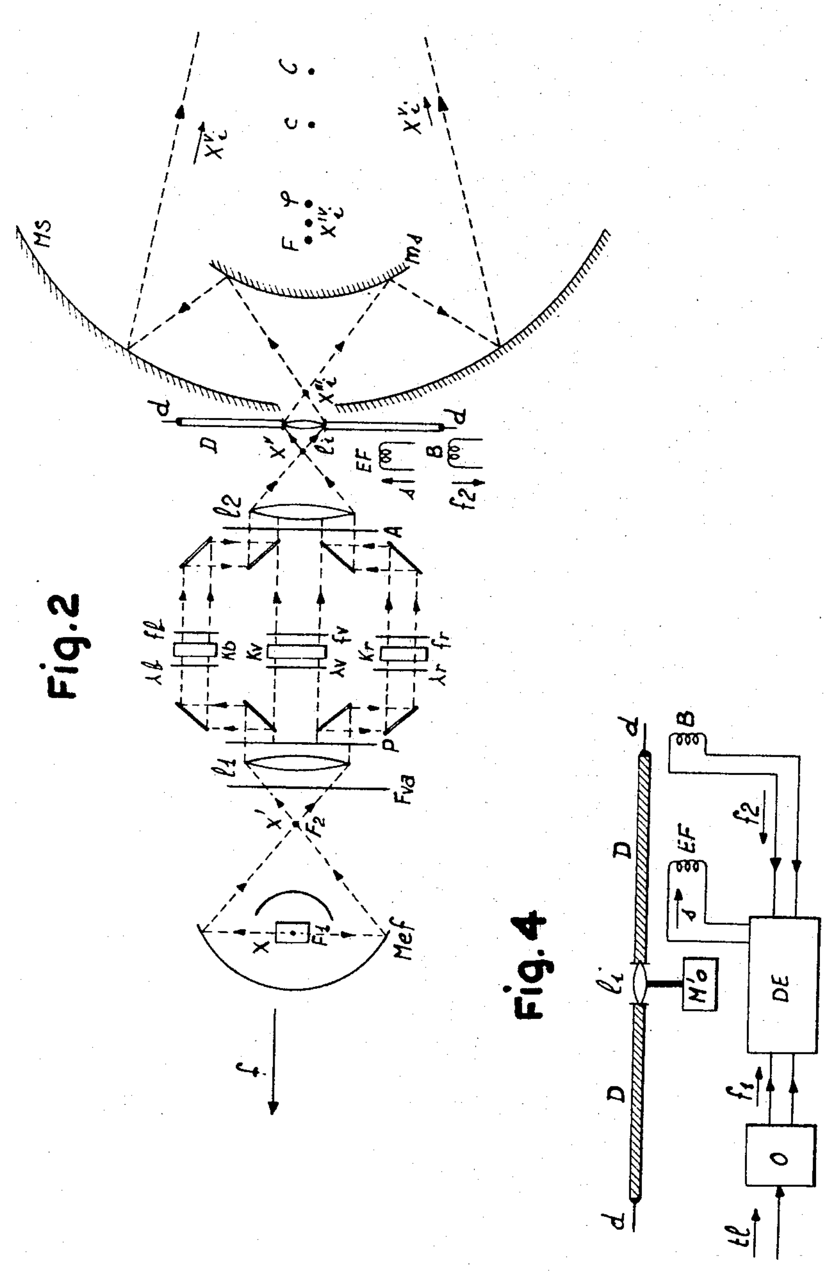

The invention will be described hereafter, with reference to the appended drawings, in which:

FIGURES 1 and 1(*a*) show a vertical section of a theater where the large projection screen EP is enlighted by projector P*bn* producing a detailed black-and-white picture, upon which projector PC superimposes a coarse picture in saturated colors, FIGURE 2 shows the optical part of projector PC, FIGURE 3 illustrates the modulation of the color of the light inside said optical part of projector PC, FIGURE 4 shows the electronic arrangement for stabilizing the speed of rotation of the disc D of said optical part of projector PC, said disc being associated with the rotating mirror drum TRM of FIGURE 1.

The optical part of projector PC, as represented on FIGURE 2, comprises:

(1) the disc D made of magnetic material, having along one circle, as many lenses as there are lines in one field of the television coarse picture of the televised scene, and having, along its circumference, a plurality of teeth *d*, *d*; only one lens $l_i$, which is at the top of disc D when said disc rotates under the action of electric motor $M'_o$, is shown on FIGURE 2 or FIGURE 4; these teeth *d* induce, in a coil B, a sinewave (of frequency $f_2$) when disc D rotates; an oscillator (O, FIGURE 4), synchronized by the received line synchronising signals $t_l$, produces a sinewave at the frequency $f_1$ of the scanning lines in the accepted television standards; the frequency $f_2$, always greater than $f_1$, is compared to frequency $f_1$ in a differential electronic arrangement DE, which so produces a stabilizing signal *s* feeding an electromagnet EF for providing a more or less greater braking action on magnetic disc D, (2) an optical arrangement made of a very large concave mirror (MS, FIGURE 2) having a central hole in front of which the circle of small lenses of disc D moves, the upper lens $l_i$ producing, between said large concave mirror MS and the associated convex mirror *ms*, a line of successive colored images of the powerful white light X, corresponding to one line of one field of the coarse picture (in saturated colors) of the televised scene, the color being "modulated" by the crystals $K_b$, $K_v$, $K_r$ inserted between crossed polarizer P and analyzer A (FIGURE 2).

FIGURE 1 is a vertical section of a theater-building AB'CD', the public seating on the floor CD, in front of the projection screen EP. P*bn* is the projector for the detailed black-and-white picture of the televised scene, controlled by the "luminance weighted signal" $L'=L/S$, and synchronized by signals $t_1$ and $t_1$ coming from the distant television transmitter. TRM is a large mirror drum, rotating at a speed of 10 turns per second in the direction of the arrow, under the action of an electric motor M*o* suspended on the ceiling AB of the theater and synchronized by synchronizing signals $t_1$, TRM having five mirrors (in Europe) or 6 mirrors (in United States of America), because the television standards specify 50 picture fields in Europe, and 60 picture fields in United States of America. The color-projector PC, the optical part of which is shown on FIGURE 2, is located behind the wall BD supporting the projection screen EP, its large concave spherical mirror MS emerging on top of said projection screen. The enlarged image of the small colored line, produced by lens $l_1$ between the mirrors MS and *ms*, is reflected upon one mirror of rotating drum TRM, and produces further, on screen EP, one line of one field of the coarse picture in saturated colors of the televised scene; the paths of light coming out of projector P*bn*, or out of projector PC are represented by dotted lines on FIGURE 1; the colored light produced by PC sweeps the projection screen EP when motor M*o* rotates in the direction of the arrow; this colored light mixes with the white light produced by projector P*bn* upon screen EP, whereby the desired degree of color saturation is always obtained for each point of the final image of the televised scene.

In the American television standards, there are per second 60 interlaced picture fields having each $$525/2=262.5$$

lines; therefore disc D (FIGURES 2 and 4) should have 263 small lenses (such as $l_1$) with a small opaque space corresponding to the time interval during two successive picture-fields, and disc D should make 60 turns per second. In the European television standards, there are per second 50 interlaced picture-fields having each $$625/2=312.5$$

lines; therefore disc D should have 313 small lenses (such as $l_1$) with a small opaque space corresponding to the time interval during two successive fields, and disc D should make 50 turns per second. The picture-scanning-lines frequency $f_1$ is 15,750 sec.$^{-1}$ in the American standards, and disc D should have 270 teeth *d* along its circumference, so that the frequency $f_2$ of the wave induced in coil B will be: $270\times60=16{,}200$ sec.$^{-1}$, substantially greater than $f_1$; the picture-scanning-lines frequency $f_1$ is 15,625 sec.$^{-1}$ in the European standards, and disc D should have 320 teeth *d* along its circumference, so that the frequency $f_2$ of the wave induced in coil B will be $320\times50=16{,}000$ sec.$^{-1}$, substantially greater than $f_1$.

Now will be considered the electric modulation of the color of the light by means of crystals ($K_b$, $K_v$, $K_r$) of FIGURE 2, and the enlightment of projection screen EP of FIGURE 1 by the colored light projector PC. X is a powerful source of white light (electric discharge between electrodes within pressurized xenon) absorbing an electric power of 6500 watts, located at the first focus $F_1$ of a *cold*-elliptic-mirror $M_{ef}$, and at the center of a spherical mirror *m*, a very great part of the heat being radiated in the direction of arrow *f*, at left of $M_{ef}$. At the second focus $F_2$ of elliptic mirror $M_{ef}$ is produced a very small image X' (of source X) having a brightness B of 95,000 stilbs (because mirror *m* superimposes to the electric discharge X its image, and produces so a very bright small spot). X' is also the focus of collimating lens $l_1$, and F*va* is an anticaloric glass plate, so that lens $l_1$ receives very little heat. P is a polarizer and A is an analyzer crossed with P, both being perpendicular to the beam of parallel white-light-rays produced by $l_1$. Mirrors (at 45 degrees) split this beam of light-rays in three parts going respectively through the three "colored-light-modulators" $\lambda_b$, $K_b$, $f_b$ for saturated blue, $\lambda_v$, $K_v$, $f_v$ for saturated green, $\lambda_r$, $K_r$, $f_r$ for saturated red—$f_b$, $f_v$, $f_r$ being interferential color filters passing respectively only blue, or green, or red monochromatic radiations, and $\lambda_b$, $\lambda_v$, $\lambda_r$ being transparent plates (for example in mica) producing a retardation of one quarter of wavelength for blue light $\lambda_b$, or for green light $\lambda_v$, or for red light $\lambda_r$. Other mirrors (at 45 degrees) reconstitute a beam of parallel rays of colored light, going through analyzer A and further concentrated, by focussing lens $l_2$, on a point X'', where is produced a very bright small image X'' of source X, in front of the upper small lens $l_1$ of rotating disc D.

The motion of lens $l_1$ forms, at a given instant, a line of real images $X_1'''$ of X'', which is one line of one field of the desired coarse picture of the televised scene (in saturated colors, determined by the birefraction of $K_b$, or $K_v$, or $K_r$, at this instant); this line of colored luminous spots $X_1'''$ is formed between the large concave spherical mirror MS, of center C and focus F, and the small convex mirror *ms*, of centre C and focus $\varphi$. *ms* produces, between F and $\varphi$, a line of *virtual* images $X_1^{iv}$ of the spots $X_1'''$, and MS produces a much larger line of *real* images $X_1^{v}$ on projection screen EP, after reflection on mirror drum TRM (FIGURE 1). This line of real images $X_1^{v}$ of lamp X constitutes one line of one field of the desired coarse picture, in saturated colors, of the televised scene, and the framing of this coarse picture inside the projection screen (EP, FIGURE 1) can be adjusted by moving slightly the convex mirror (*ms*, FIGURE 2) with reference to the large concave mirror MS.

The brightness of this coarse picture in saturated colors of the televised scene is determined by means of the formula quoted hereabove, and giving the enlightment (E, in lux) of the projection screen EP:

$$E=\frac{1}{6}\,\frac{B.S.}{N.D.^2}\ \text{lux}$$

According to the American television standards pictures of 525 lines, aspect ratio 4/3, as the chrominance spectrum (in the received video-signal) is only about one-fourth of the luminance spectrum, the total number N of elements of the coarse colored picture of the televised scene is:

$$N=\frac{4}{3}\left(\frac{525}{4}\right)^2=\frac{4}{3}132^2=23232$$

S is the surface of the circle having, for circumference, the edge of the large concave mirror MS, expressed in square centimeters; if the radius of this circumference is 75 centimeters, $S=\pi\ (75)^2=17{,}662$ cm.$^2$. The brightness B of lamp X (absorbing a power of 6500 watts) is 95,000 stilbs (candelas per square centimeter) and $B/6=15{,}833$. In order that the enlightment produced by the coarse picture, in saturated colors, of the televised scene upon the projection screen EP should be 100 lux (or 10 foot lamberts), the length D of the light-path between mirror MS and screen EP on FIGURE 1, expressed in meters must be in accordance with the formula:

$$100=\frac{15833\times17662}{23232}\times\frac{1}{D^2}$$

so that $D=11$ meters

According to the European television standards (pictures of 625 lines, aspect ratio 4/3), as the chrominance spectrum (in the received video-signal) is again about one-fourth of the luminance spectrum, the total number N of elements of the coarse colored picture of the televised scene is:

$$N=\frac{4}{3}\left(\frac{625}{4}\right)\left(\frac{625}{4}\right)=32552$$

With the same large concave mirror MS having a useful surface $S=17,662$ cm.$^2$, and with the same lamp X having a brightness $B=95,000$ stilbs (or $6\times15,833$), in order to obtain an enlightment of 100 lux (or 10 foot-lamberts) upon the projection screen (EP, FIGURE 1), the length of the light-path D between mirror MS and said screen EP, expressed in meters, must be in accordance with the formula:

$$D=\sqrt{\frac{15833\times17662}{32552\times100}}=\sqrt{87}=9 \text{ meters}$$

These values of D (11 or 9 meters) are compatible with the relative positions of mirror MS and projection screen EP in a theater, as shown on FIGURE 1.

The voltages $C_b$, $C_v$, $C_r$ (corresponding to the blue, green, red components of the hue signal C) are, in case of FIGURE 2, not applied directly to the electrodes of crystals ($K_b$, $K_v$, $K_r$) as on FIGURE 1*a*, but are put in opposition with an appropriate (direct-current or continuous) biasing voltage, in order to obtain *alternating modulating voltages* ($V_b$, $V_v$, $V_r$) applied respectively to said crystals; only the linear part of the square-sine-characteristic of FIGURE 3 [giving the intensity I of the light emerging from analyzer A (FIGURE 2) as a function of the alternating modulating voltage V, account being taken of the presence of the quarter-waveplate $\lambda_b$, or $\lambda_v$, or $\lambda_r$, FIGURE 2] is utilized. On FIGURE 2, $K_b$, $K_v$ or $K_r$ is, for example, a cylinder of single crystal of dihydrogen potassium phosphate, the bases of which are perpendicular to the C axis, and are parallel to the faces of the corresponding quarter-waveplates and also parallel to the crossed polarizer P and analyzer A, the neutral lines of said crystals, as well as the neutral lines of said quarter-waveplates, being at 45 degrees from the privileged direction of polarizer P; metallized conductive frames (in shape of a rectangle through which pass the rays of white light collimated by lens $l_1$ on FIGURE 1) constitute the electrodes of the crystals ($K_b$, $K_v$, $K_r$), to which are applied the alternating modulating voltages ($V_b$, $V_v$, $V_r$) corresponding to the components of hue signal C.

For a modulating voltage $V=0$, the corresponding point of the characteristic of FIGURE 3 is the middle M of the linear part; as the light goes through the crystal parallely to the *c* axis, and as there is no applied modulating voltage, the crystal produces no retardation, and the intensity I of the light emerging from analyzer A has its mean value corresponding to the retardation (one quarter of a wave length, $\lambda/4$) produced by the corresponding quarter-waveplate. For the modulating voltage $V_1$, maximum of the absolute value of the *negative* part of the modulating voltage V, the corresponding point on the characteristic is $M_1$, the crystal produces a retardation nearly equal to $(-\lambda/4)$, whereas the corresponding quarter-waveplate produces a retardation equal to $(+\lambda/4)$; the resultant is zero, and as analyzer A is crossed with polarizer P, no light practically emerges from analyzer A. For the modulating voltage $V_2$ (maximum of the *positive* part of the modulating voltage V), the crystal produces a retardation nearly equal to $(+\lambda/4)$, which is so added to the retardation $(+\lambda/4)$ produced by the corresponding quarter-waveplate; the resultant is $\lambda/2$, and the light emerging from analyzer A (crossed with polarizer P) has then its maximum intensity.

While the invention has been illustrated and described as hereabove, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. Color television receiving station, on the large projection screen of which are superimposed a black-and-white detailed picture of the televised scene and a coarse picture of said scene with saturated colors produced by transparent members associated with color filters and becoming birefringent under control of voltages corresponding to the primary components of the received hue signal, in which the projector, producing said coarse picture in saturated colors, comprises in combination:

- a very powerful source of white light located at one focus of a cold elliptic mirror,
- a collimating lens, the focus of which coincides with the other focus of said elliptic mirror,
- a polarizer, located behind said collimating lens,
- mirrors for separating the beam of parallel rays of white light emerging from said polarizer, into three parts going respectively through three colored-light-modulators, each comprising one of said transparent members with, on one side, an interferential color filter, passing only light of saturated (blue, or green, or red) color, and with, on the other side, a crystalline-plate producing a fixed retardation of a quarter of the wavelength of said light of saturated color,
- other mirrors bringing close together the rays of colored lights emerging from said modulators, for building a beam of parallel rays of a light having the color corresponding to the received hue signal, to the primary components of which correspond the voltages applied to said transparent members,
- an analyzer crossed with said polarizer, and perpendicular to said parallel rays of colored light, and followed by a focussing lens for producing a small colored image of said source of white light,
- an optical arrangement comprising a very large concave spherical mirror with a central hole and a smaller convex mirror in front of said hole,
- a rotating disc made of a magnetic material, having a plurality of teeth around its circumference, and bearing a circular assembly of small lenses, successively moving in front of said hole of said concave mirror, whereby the upper small lens, enlighted by said colored image of said source of white light, produces between said concave and convex mirrors, a line of colored luminous spots corresponding to one line of one field of said coarse picture of the televised scene,
- a coil positioned in front of said teeth of said disc and in which is induced a sine-wave of predetermined frequency when said disc rotates at its nominal speed,
- a differential electronic arrangement for stabilizing the speed of rotation of said disc bearing said small lenses,
- and a rotating mirror drum, fixed on the shaft of a motor controlled by the received field synchronizing signals, and upon which is reflected the enlarged image of said line of colored luminous spots before reaching said large projection screen.

2. Color television receiving station in accordance with claim 1, in which said differential electronic arrangement for stabilizing the speed of rotation of said disc bearing said small lenses and having said teeth around its circumference, comprises:

- an electric motor for driving continuously said disc,
- an oscillator controlled by the received line synchronizing signals, for generating a sine wave at the frequency $f_1$ of said signals, said coil, positioned in front of said teeth of said disc, and in which is induced a sine-wave at a frequency $f_2$, slightly greater than $f_1$ and varying more or less when said disc rotates at a speed greater or smaller than its nominal speed, a differential electronic arrangement, energized by said sine-waves of frequencies $f_1$ and $f_2$ respectively, for producing a correcting signal, and an electromagnet, energized by said correcting signal, and positioned in front of said disc of magnetic material, in order to act, more or less on said disc, as a magnetic brake, whereby the upper small lens of said disc moves, in front of the central hole of said large concave mirror, substantially along a rectilinear path and with a stabilized predetermined speed.

References Cited

UNITED STATES PATENTS

| | | | |
|---|---|---|---|
| 2,703,506 | 3/1955 | Kelly | 178—7.88 X |
| 2,990,449 | 6/1961 | Valensi | 178—5.4 |
| 3,275,743 | 9/1966 | Conant | 178—5.4 |

JOHN W. CALDWELL, *Acting Primary Examiner.*

J. A. O'BRIEN, *Assistant Examiner.*